(No Model.)
A. SMITH.
BAND SAW MILL.
No. 283,157. Patented Aug. 14, 1883.
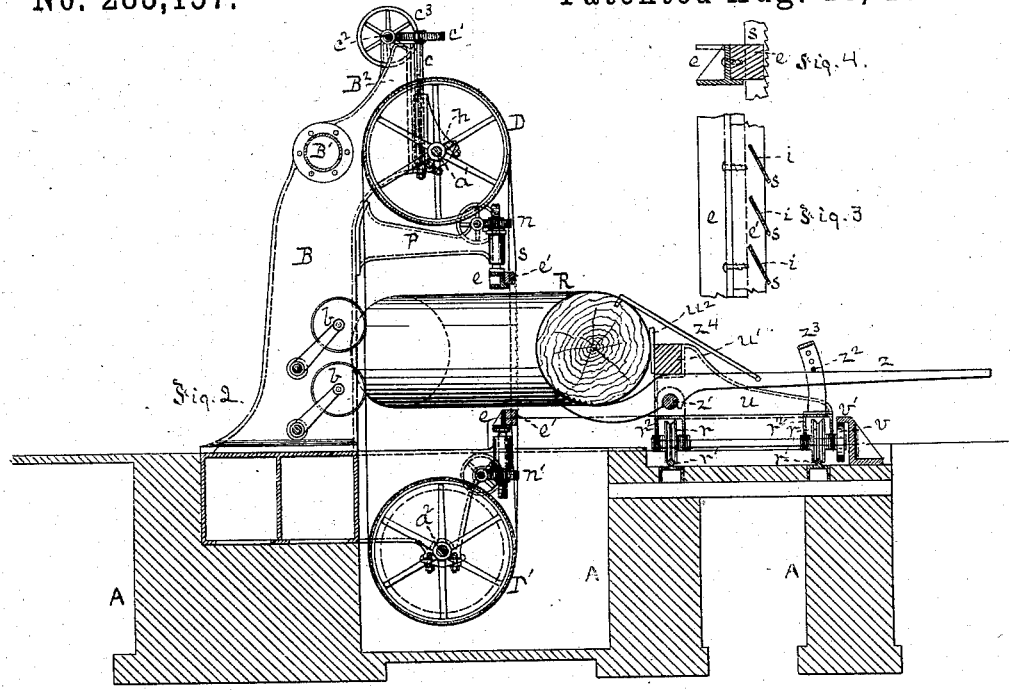
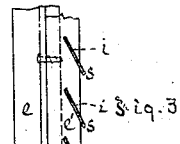
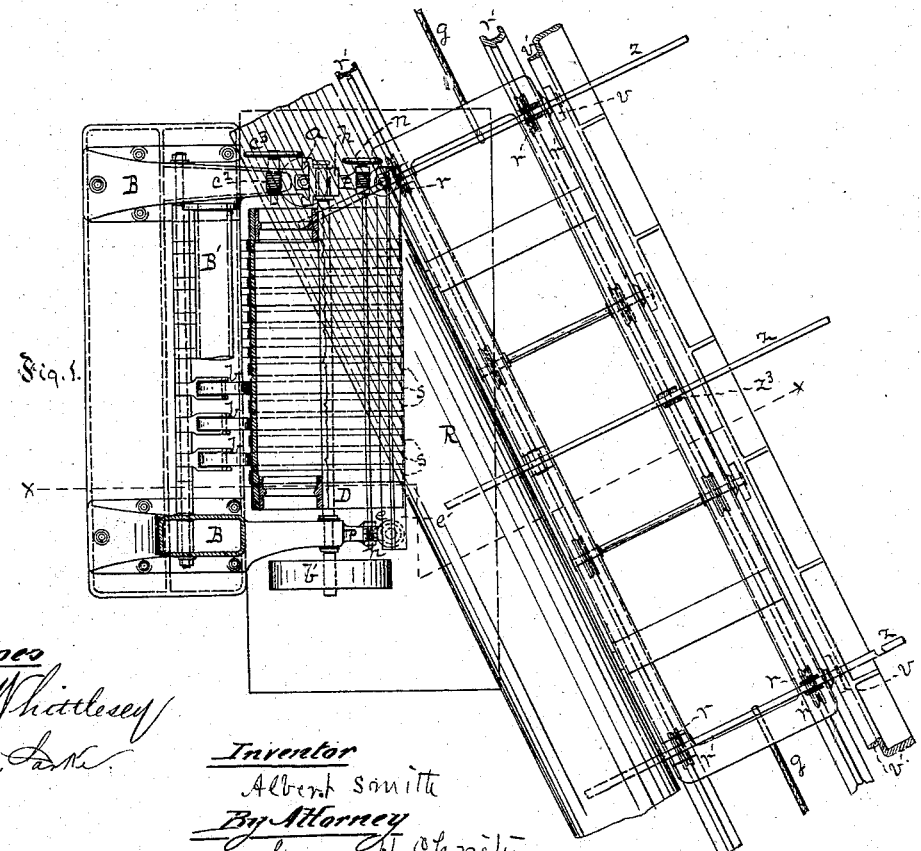
Witnesses
R. H. Whittlesey
C. M. Larke
Inventor
Albert Smith
By Attorney
George H. Christy

UNITED STATES PATENT OFFICE.

ALBERT SMITH, OF ZURICH, SWITZERLAND.

BAND-SAW MILL.

SPECIFICATION forming part of Letters Patent No. 283,157, dated August 14, 1883.

Application filed January 22, 1883. (No model.)

*To all whom it may concern:*

Be it known that I, ALBERT SMITH, of Zurich, Republic of Switzerland, temporarily a resident of Allegheny, county of Allegheny, State of Pennsylvania, have invented or discovered a new and useful Improvement in Band-Sawing Machines; and I do hereby declare the following to be a full, clear, concise, and exact description thereof, reference being had to the accompanying drawings, making a part of this specification, in which—like letters indicating like parts—

Figure 1 is a plan view (but with the upper saw-drum and one end of the frame partly in section) of a sawing-machine embodying my present invention. Fig. 2 is a vertical sectional view in the plane of the line $xx$, Fig. 1. Fig. 3 is a detached plan view, to an enlarged scale, of a portion of the saw-deflecting and guide bar employed; and Fig. 4 is a transverse sectional view of Fig. 3.

My present invention appertains to certain improvements in mills for using band or endless saws in gangs. In mills of this class, as heretofore devised, where two or more band-saws were to be used simultaneously to saw or slit the same log or other timber or article of lumber, provision was made for getting the lumber or "stuff" cut of the proper width or thickness by varying the diameters of the pulleys or drums over which the different saws operated. Thus, if one-inch stuff was desired, each successive pair of pulleys of the series was two inches greater or less in diameter than the preceding pair, leaving the thickness of the saw-kerf out of consideration, and each band-saw passed around its own pair of pulleys. In a machine, mill, or apparatus thus organized, no way was known of varying the thickness of the stuff produced except by changing the pulleys, and this was so difficult and expensive that, practically, band-saws operated in gangs have not come into general or extensive use, except for special work or in machines where a uniform thickness of product is desired; and, it is a further objection to the construction above referred to that but a very small number of saws can be employed in one gang without making the machine large and cumbersome, and varying greatly the speed of the different saws of the gang. Thus, in a machine adapted to saw a log one foot in diameter into one-inch boards, and assuming the smallest pulley to be one foot in diameter, the largest pulley would have to be, say, thirty-two inches in diameter; and as all the pulleys have to be driven from the same shaft, the saws working over the larger pulleys must necessarily move proportionally faster than those working over the smaller pulleys; hence the speed of saw-movement, which is adapted to do the best work and do it rapidly, cannot be secured in all the saws.

In applying my present invention, I pass the saws around pulleys of the same diameter or arrange them all on two drums, so that I keep the dimensions of pulleys or drums within reasonable limits, and am enabled to work all the saws at a uniform speed. The carriage or feed-table by which the log or other article or material to be sawed is fed to the saws, is arranged angularly as regards the line of the shaft of the saw-drums, and the saws themselves, through so much and that part of their lengths as are operative in sawing, are deflected or twisted by suitable guiding devices out of the plane in which they would otherwise run and into planes parallel with the axis of the log or other article to be sawed, or into planes coincident with the planes of cut or kerf. In this way I construct what I believe to be a practically-operative band-sawing machine, apparatus, or mill, having a gang of saws—two or more in number—adapted to the ordinary requirements of lumber producing or working.

In the drawings, A represents any suitable foundation on which I erect the frame-work of the sawing machinery and of the carriage. The former has bracket-shaped uprights B, braced transversely by one or more cross-ties, B'. The vertical face of each bracket-head $B^2$ is provided with suitable ways or guides, of which the dovetail form shown in the drawings at $a$, Fig. 1, is a good illustration, so that a vertically-adjustable hanger, $h$, may be moved up and down thereon by a threaded stem, $c$, screw-pinion $c'$, worm $c^2$, and handwheel $c^3$, which devices, being old in the arts, need not be further described. One of such hangers to each bracket-head provides means for carrying and adjusting the shaft $a'$ of the upper saw-drum, D, and the shaft of the lower drum, D', is mounted in suitable bearings, as at $a^2$ in a depending part of the main frame. The band or endless saws $s$, each of the usual or any desired construction, may be passed around these drums at a distance apart or spaced, as may be desired. These saws are steadied in their motion on the rear side by freely turning pulleys $b\ b$, so as to prevent undue vibration, and, if necessary, to keep the saws taut. Power to drive the saws may be communicated by a band-wheel, $b'$, in the usual or other known way.

The article to be sawed may be represented by the log R, and, as presently to be described, it is mounted on a carriage so as to be presented endwise to the saws, but in a line or direction of feed angular to the plane in which the saw-blades would ordinarily move. Understanding, now, that the planes of cut or kerf must be in the general direction of the length of the log, I provide for twisting the saw-blades through so much and such parts of their lengths as are actually employed at any instant, and from instant to instant, in sawing, out of the plane they would otherwise run in on the sawing side, into a series of planes, each parallel with the general direction of the length of the log. To do this I employ two angularly-slotted guide-bars, preferably made each in two parts, $e\ e'$, and as to their construction more perfectly represented in Fig. 3 and 4. The bar $e$, made of iron or steel, acts as a carrier or support for the slotted guide-bar $e'$. The bar $e$, as arranged above the log is mounted at its ends in movable bearings, which, by screw and worm gear $n$, are adjustably connected to fixed brackets P, and the bar $e$ below the log is, by similar end bearings, screw and worm gear $n'$, adjustably connected in like manner with the lower part of the main frame. These means of adjustment enable me to set the twisting and guiding bars in close proximity to the top and bottom of the log, so that no greater length of saw-blade may be twisted than is necessary, and so that the part so twisted shall be properly guided in doing its work. The front bars, $e'$, or these parts of the compound bars $e$, are made preferably of wood, and are bolted to the bars $e$, so as conveniently to be removed for renewal or repairs. The front or outer edges of these bars have each a series of slots, $i$, cut in planes in which it is desired the saws, while sawing, should work, and these slots are cut at an angle corresponding to that of the log in its relation to a vertical plane passing through the pulley-axes in the direction of their length, and, preferably, they are exactly or approximately of the depth equal to the width of the saw-blades back of the bases of the teeth, as illustrated in Figs. 3 and 4.

Any suitable carriage may be employed, provided only that it has the angular arrangement referred to as above and illustrated in the drawings. The carriage-trucks $r$ run on ways $r'$, and carry the side bars, $r^2$, of the carriage. The log is carried on one side of the carriage, so as to project beyond the frame, by a series of lever-rests, $z$, having open-sided pivot or fulcra seats, which rest on pivots or fulcra $z'$ at one side of the carriage, and are held in place so as to support and carry the log by catches or pins $z^2$, passing through posts $z^3$ on the other side of the carriage-frame, and dogs $z^4$ may be added to steady the log. At least three of these lever-rests should be employed, so that while two are always present and in use as a support for the log, one at or toward each end, the third one may be moved from a point immediately in front of the saws to a point back of them, and the successive ones may thus be moved as the work of sawing progresses. The carriage may be strengthened by cross-heads $u$, and a side beam, $u'$, may be added as a side rest for the log, and to give greater steadiness wedges $u^2$ may be driven in between the side beam and the log. The usual means may be added, as by ropes $g\ g$, or reversible gear, for moving the carriage back and forth; and to keep the carriage from tipping while carrying the log beyond one side, a wheel, $v$, may be added on the opposite outer projecting end of each truck-axle, and such wheels be provided with a top bearing by a flanged plate, $v'$, as shown in Fig. 2.

While I have shown and described this apparatus as employed for sawing logs, the same subject-matter of invention may, with modifications such as the skilled mechanic will readily suggest, be incorporated in sawing, cutting, or slitting machines generally, and for such purposes any suitable feed-table may be employed, which the stuff to be sawed, cut, or slit may overhang so as to project beyond the edge of the table. Also, twisting guide-rollers may in the log-sawing machine, or in any of its modifications, take the place of the slots $i$; or friction-rollers may be arranged in the side walls of the slots. These and other like modifications, including the substitution of mechanical equivalents, are included within the scope of the present invention; and, still further, the saw-carriage or feed-table, particularly, if it be comparatively short, may be so pivoted or mounted that its angle relative to the vertical plane passing longitudinally through the axes of the pulley-shafts may be varied at pleasure, and thereby the thickness or width of the product may be varied; but in such case the angle or twist given to the saw-blades must be correspondingly varied by substituting a properly-recessed guide-bar $e'$ or in other suitable way.

The saws, where they pass around the pulleys, may run in grooves or be spaced and guided at such points in other suitable way. The thickness or width of the product may be doubled by removing every alternate saw, or with movable spacing devices and interchangeable twisting bars $e'$, or equivalent mechanism. The distances between saws may be varied at pleasure with consequent variation in the thickness or width of the product; but the right to separate patents for mechanisms for performing the functions thus referred to is hereby reserved; and I also include herein machines, substantially as described and claimed, without limitation as to the material to be operated on, as such machines can be used to cut or saw stone, marble, blocks of sugar or other divisible article or material.

Another advantage of the arrangement of all the band-saws of a series of two or more, on drums of the same diameter, arise from the fact that a uniform tension can be given to each saw while in operation. Where, as sometimes it has been done, the different saws of a different series have been made of different lengths and thrown into different planes by guide-rollers or dead-pulleys, (but without twisting,) the additional friction and oblique directions of strain tend to increase the resistance met with in sawing, so that the tension on the different saws is so varied as to deteriorate from the quality of the work done. By keeping, as I do, the saws of the same length in each machine and working them around drums or pulleys of the same diameter and driving all at a uniform speed, I am enabled to do better work.

I claim herein as my invention—

1. A series of two or more band-saws in combination with a twisting mechanism applied to each saw, whereby the operative part of each saw is twisted out of its otherwise normal plane, substantially as set forth.

2. The combination of a series of two or more band-saws, a twisting mechanism to each, and a feed carriage or table arranged with a line of motion making an angle as regards a vertical plane passing longitudinally through the axes of the band-saw pulleys, substantially as set forth.

3. A band-sawing machine having in combination a pair of drums or pulleys, D D', for carrying a series of two or more band-saws of a substantially uniform length, a twisting mechanism to each saw, and an angularly-arranged carriage or feed-table, substantially as set forth.

4. The combination, in a band-saw frame, of drums D D', one of which is vertically adjustable, and vertically-adjustable saw-twisting mechanisms $n$ $n'$, substantially as set forth.

5. In combination with a log-carriage, a series of three or more movable log-rest levers, $z$, each having an open-sided fulcra-seat, $z'$, a dog, $z^t$, and adapted to be locked to a post, $z^3$, substantially as set forth.

6. A log-carriage provided with mechanism for carrying a log beyond one side thereof, and provided with wheels $v$ on the other side thereof, in combination with a top bearing, $v'$, for such wheels, substantially as set forth.

In testimony whereof I have hereunto set my hand.

ALBERT SMITH.

Witnesses:
R. H. WHITTLESEY,
C. M. CLARKE.